June 11, 1940.　　　　　M. L. HANEY　　　　　2,204,133
TICKET DELIVERING AND RECORDING MACHINE
Filed Feb. 3, 1939　　　　3 Sheets-Sheet 1
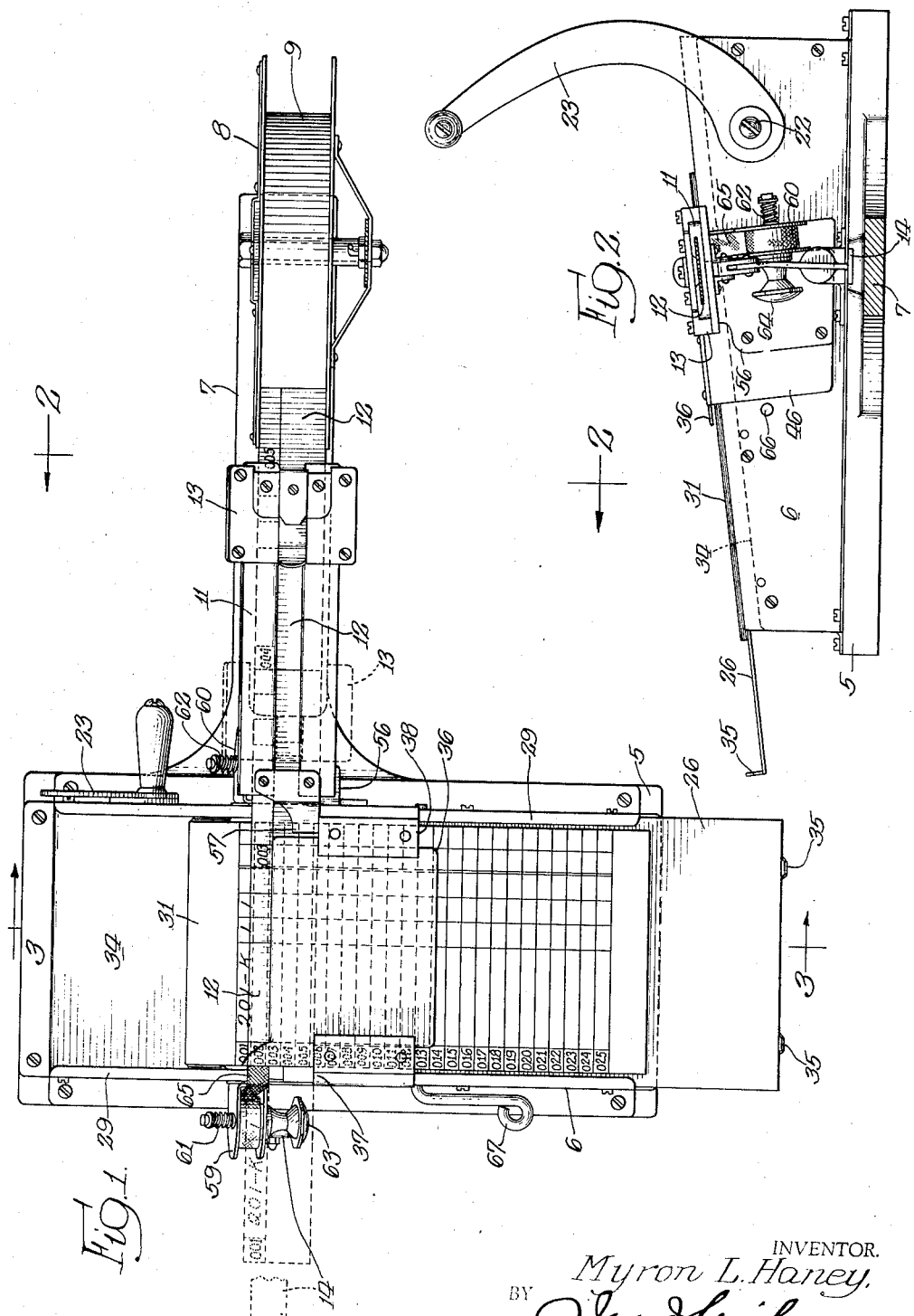
INVENTOR.
Myron L. Haney,
BY
Ira J. Wilson
ATTORNEY.

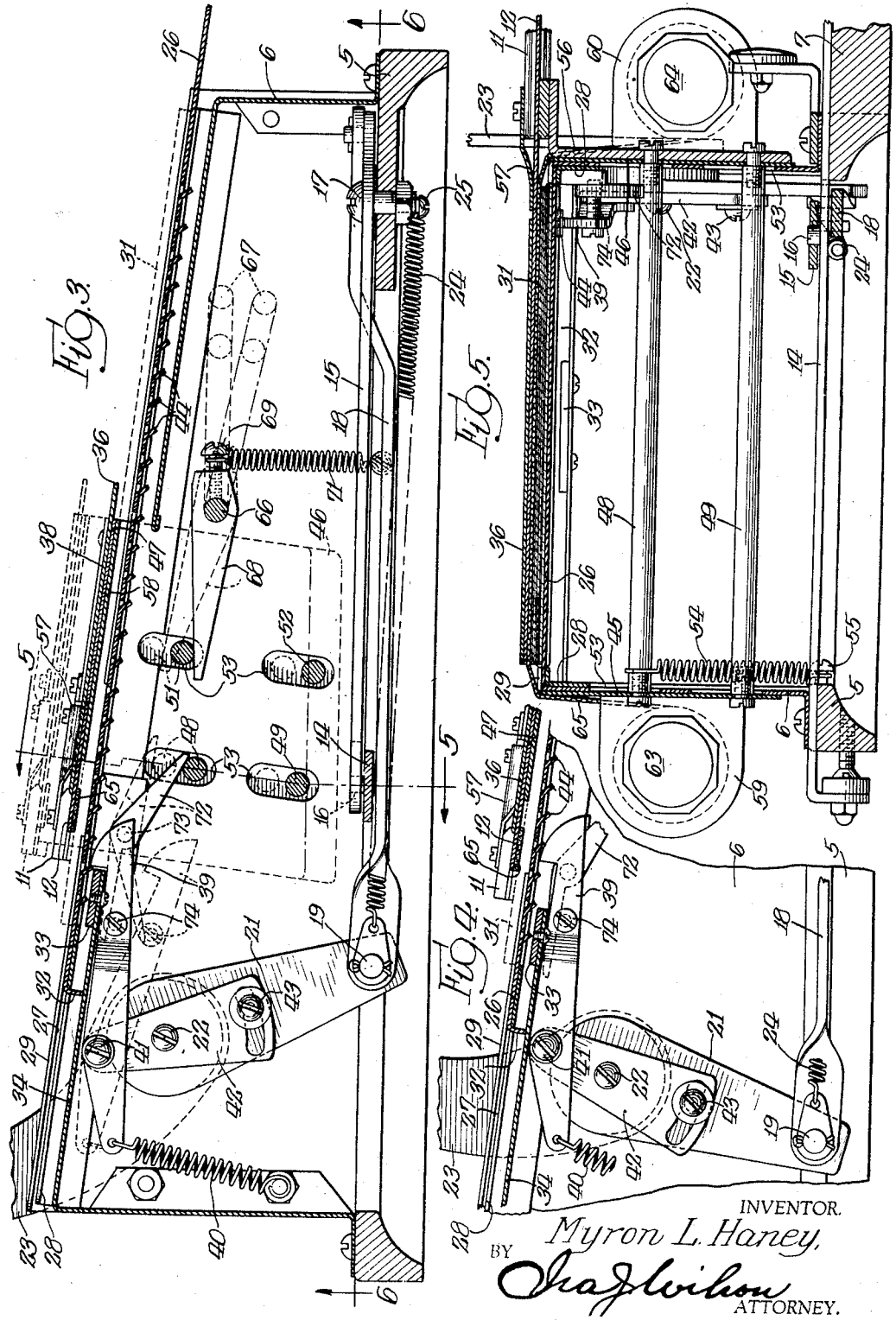

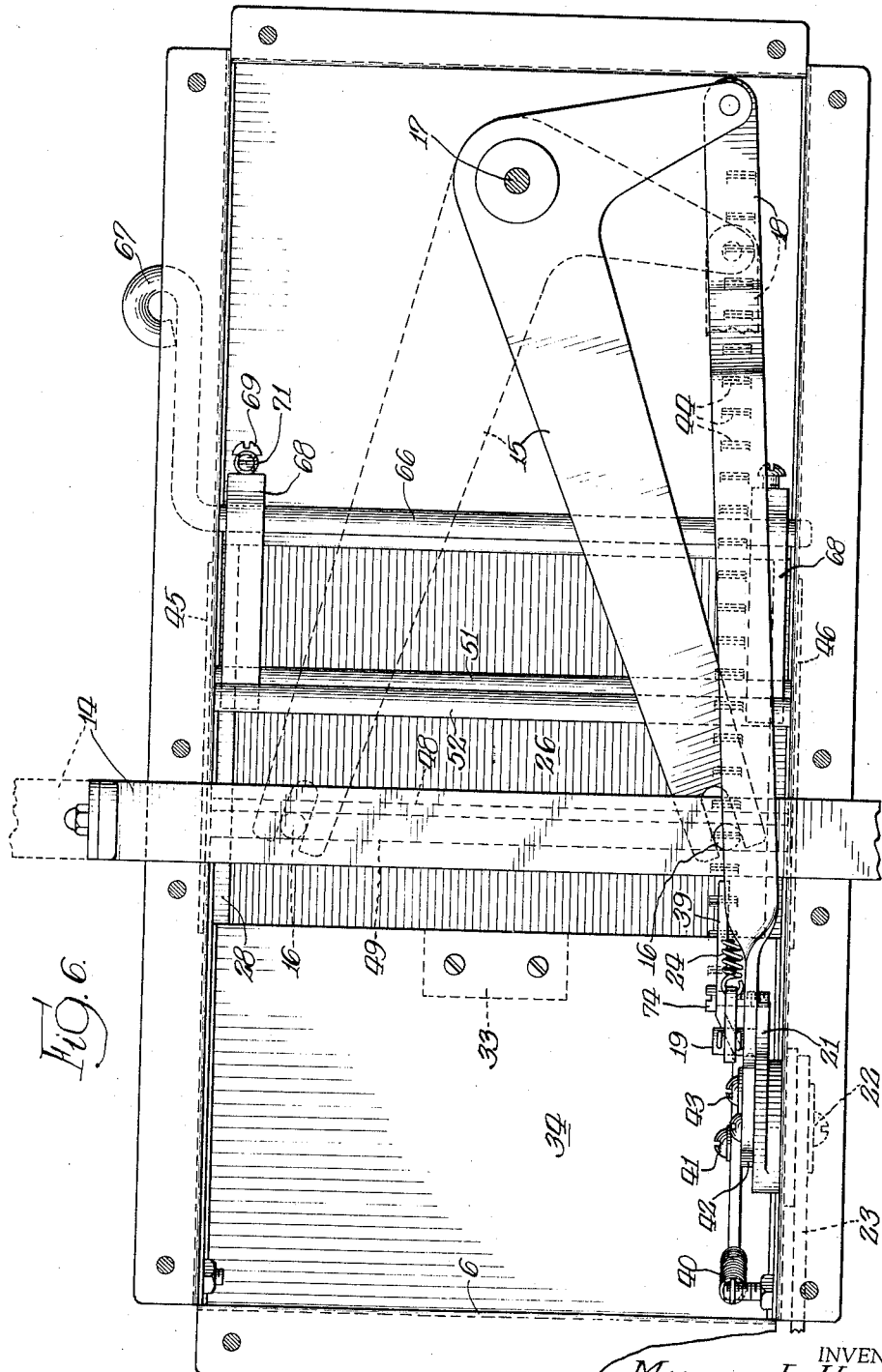

Patented June 11, 1940

2,204,133

UNITED STATES PATENT OFFICE 2,204,133

TICKET DELIVERING AND RECORDING MACHINE

Myron L. Haney, Chicago, Ill.

Application February 3, 1939, Serial No. 254,346

7 Claims. (Cl. 282—5)

This invention relates to a machine for delivering individual tickets and maintaining a record not only of the number of tickets sold or delivered, but of the individual data appearing on each ticket.

Heretofore in the sale of tickets, each bearing individual data applied to the ticket at the time of sale, it was necessary for confirmation and checking purposes that an independent record be made of each ticket sold and of the individual data appearing thereon by writing the same on a separate sheet or by transcribing the data through a carbon sheet upon an underlying record sheet simultaneously with the inscribing of the data on the ticket.

In other words, the ticket seller was obliged to apply the individual data to the ticket and then record the ticket with its data on a record sheet, all of which was time consuming, or the ticket was placed upon a carbon sheet over a record sheet, whereupon the act of marking the individual data upon the ticket would reproduce this data upon the underlying record sheet. This method required accurate placement of the ticket upon the record sheet and also involved the use of carbon sheets which were likely to become displaced with the ultimate result that the record could not be made through the carbon sheet much quicker than it could be separately made on the record sheet. Either method, however, involved the expenditure of considerable time and energy and was likely to result in errors.

The purpose of my present invention is to provide a machine which will eliminate the use of carbon paper, will accurately position the ticket upon which the data is to be inscribed in the proper predetermined relation to the record sheet so that when the data is applied to the ticket, it will through a copying ribbon be simultaneously applied not only to the underlying record sheet, but also to the back of the ticket itself. Furthermore, the machine will automatically deliver the tickets in succession from a roll and at the same time progressively feed the record sheet so that each ticket will be recorded on the sheet in proper position.

While the principles of my invention may be utilized in machines for various purposes, the machine here illustrated is adapted for, although not confined to, the delivery and recording of racing tickets upon each of which data indicating the selected horse and the selected finish position must be applied at the time of sale and must be simultaneously recorded on the retained record sheet.

To facilitate an understanding of my invention, a preferred embodiment thereof is described in the following specification and disclosed on the accompanying drawings, the scope of the invention being defined in the appended claims.

Referring to the drawings:

Fig. 1 is a plan view of a machine embodying my invention;

Fig. 2 is a sectional view on the line 2—2 of Fig. 1;

Fig. 3 is a sectional view through the machine on the line 3—3 of Fig. 1;

Fig. 4 is a fragmentary view similar to Fig. 3 but showing certain of the parts in reverse position;

Fig. 5 is a sectional view on the line 5—5 of Fig. 2; and

Fig. 6 is a view looking upwardly taken on the line 6—6 of Fig. 3.

Referring to the drawings more in detail, reference character 5 indicates the machine base upon which is mounted a housing 6 of suitable heavy sheet metal, including a top inclined at a suitable angle to facilitate writing upon and the observation of the tickets and record sheet by the ticket seller. The machine comprises essentially mechanism for feeding tickets from a roll successively across the table supporting the record sheet and mechanism for supporting and feeding, by a step by step movement, a pad of record sheets beneath and across the path of travel of the tickets, and in conjunction with these mechanisms a suitably positioned recording ribbon and mechanism for releasing the record sheet supporting table to enable the table to be returned to initial position when a record sheet has been filled.

The ticket delivery mechanism is carried by a suitable support 7 extending laterally from the housing 6 and carrying at its outer end a spool 8 upon which a roll consisting of a strip of individual tickets 9 is carried. A ticket guideway 11, positioned above the support 7 substantially in alignment with the upper surface of the table, guides the strip of tickets 12 to and across the top of the table. A reciprocatory head 13, equipped with a hitch feed of suitable construction to grip and carry with it the ticket strip upon movement toward the housing and to release the strip and return idly to the normal position shown in Fig. 1, is mounted to slide on the guideway 11. A feed bar 14 (Fig. 6) reciprocable transversely of the housing base and connected at its outer end with the feed head 13 is actuated to reciprocate said head to effect the feeding of the ticket strip by means of a lever 15 having a pin and slot connection 16 with the bar 14. Lever 15 is fulcrumed at 17 on the base, and is actuated from the full to the dotted line position shown in Fig. 6 by means of a link 18 which is connected by a pin 19 to an arm 21 fulcrumed at 22 on a side wall of the housing and having a squared shoulder extending through the housing wall, upon the outer end of which an operating handle or lever 23 is fixedly mounted.

Upon movement of the handle 23 in a counterclockwise direction viewing Fig. 2, the arm 21 is swung from the position shown in Fig. 3 to that shown in Fig. 4, thereby swinging lever 15 from the position shown in full lines to that indicated in dotted lines in Fig. 6, thereby moving the feed head 13 to the left viewing Fig. 1 to feed the ticket strip across the casing the length of one ticket. The parts are then restored to normal position by a tensile spring 24 attached at one end to the pin 19 of the arm 21 and at its other end to the base 5 through a screw stud 25.

A feed table 26 in the form of a flat plate is slidably supported so as to be movable longitudinally of the housing 6 in guideways 27 at each upper corner of the housing, said guideways being formed by supporting angle members 28 fixed to the housing side walls and overlying flanges 29 formed by bending the upper edges of the housing side walls inwardly, as indicated. This table is adapted as the support for a pad of record sheets 31 disposed thereon and held in position by clips at the upper end of the table and adapted to extend transversely inwardly between the leaves of the pad. The upper edge of the table is also provided with a downwardly extending flange 32 adapted to engage with an abutment 33 mounted upon the upper wall 34 of the housing to limit the retraction or movement to the right viewing Fig. 3 of the table. The opposite end of the table is provided with a plurality of upwardly projecting abutments 35 positioned to engage the lower edge of a guard plate 36 when the table is moved to its extreme upper position or to the left viewing Fig. 3, whereby said guard plate is moved in its guides 37 and 38 to cover the area of the ticket to which the individual data is ordinarily applied, thereby warning the operator that the table is at its extreme position and preventing further marking on the record sheet until the table has been restored to lowered position and the guard plate has been retracted to again expose a ticket.

The table is fed upwardly or from left to right viewing Fig. 2 in a step by step movement by a pawl 39 fulcrumed at 41 upon an arm 42 pivoted on the bolt 22 concentrically with the arm 21 and adjustably connected to the arm below the pivot by a bolt and slot connection 43 which provides for adjustment of the arm 42 to regulate the feeding stroke of pawl 39. A tensile spring 40 urges the pawl into cooperative relation with ratchet teeth 44 struck down from the table near one side thereof. When the lever 23 is swung to the left viewing Fig. 2 to actuate the ticket strip feed mechanism, as previously explained, the pawl 39 is moved from the position shown in Fig. 3 to that shown in Fig. 4, and upon restoration of the parts by spring 24, as previously explained, the pawl is moved in the opposite direction to feed the table forwardly a distance equal to the spacing between adjacent teeth 44 on the table. This movement of the table carries the pad 31 upwardly the distance of one line to thereby present a fresh, previously unexposed surface for the reception of the data applied to the next ticket.

An inverted U-shaped frame comprising the side members 45 and 46 and the top 47 straddles the housing 6 in proximity to the inner end of the ticket guide 11 and the side members of this frame 45 and 46 are rigidly connected together by four transversely extending rods 48, 49, 51 and 52, respectively, which project through vertically disposed slots 53 in the side walls of the housing to enable this frame to be moved vertically relatively to the housing. Normally the frame is retained in lowered position by a tensile spring 54 connected at one end to rod 48 and at its other to the base 5 by a stud 55. The plate 47 is reinforced on its lower face by a plate 58 and also carries the guides 37 and 38 in which the guard plate 36 is movably positioned, as previously explained.

The U-shaped frame not only carries the guard plate, as explained, but also the inner end of the ticket guide 11 which is supported upon a bracket 56 secured to the side member 46 of the frame. A spring guide member 57 mounted upon the inner end of guide 11 assists in guiding the ticket strip onto the table. The side members of the vertically movable U-shaped frame also carry the copying ribbon spools 59 and 60 which are yieldingly held against rotation by springs 61 and 62 and are equipped with knobs 63 and 64, respectively, by which the spools may be turned to wind the copying ribbon from one onto the other a sufficient distance to present a new copying surface when required. The ribbon indicated by 65 is a double faced ribbon which reproduces both on the underlying record sheet and also on the back or lower face of the overlying ticket the data transcribed upon the front or upper face of the ticket.

For the purpose of elevating this frame to free it from the underlying pad 31 and to permit retraction of the table 26 into its downward position, a rod 66 extending through and journalled in the side walls of the housing 6 is provided at one end with an operating lever 67, and within the housing is equipped with an arm 68 (Fig. 2) fixed on the rod by a set screw 69 and yieldingly held in engagement with the rod 51 by a tensile spring 71. Upon depression of lever 67 viewing Fig. 1, the rod 66 is swung in a clockwise direction viewing Fig. 2 to lift the frame through the intermediary of the lever 68 and rod 51 from the full line position to that shown in dotted lines in Fig. 2.

This upward movement of the frame also serves to retract the feed pawl 39 from the full line to the dotted line position shown in Fig. 2 by means of a lever 72 overlying rod 48 and fulcrumed at 73 on the side wall of the housing. The other arm of lever 72 overlies an abutment 74 projecting laterally from the dog 39 so that as lever 72 is swung in a counterclockwise direction, the abutment 74 and with it the dog 39 is depressed and withdrawn from operative relation with the teeth 44 of the table, thereby permitting the table to be manually slid to the right viewing Fig. 2 as far as is permitted by the abutment 33.

The operation of my machine is substantially as follows: Assuming that a pad of record sheets is in position on the table and that the foremost ticket of the ticket roll has been fed forwardly until it is positioned directly over the table, the upper half of the ticket is now exposed at the upper edge of the guard plate 36. The ticket seller now applies to the ticket in the appropriate spaces indicated thereon the requisite data indicating the horse and the position for which he is played. This data is applied with a pencil, and through the copying ribbon lying between the ticket and the record sheet this data is also simultaneously applied to the sheet and to the back of the ticket. The tickets are consecutively numbered and the lines of the record sheet are correspondingly numbered from top to bottom.

When ticket 001, for instance, viewing Fig. 1, is directly over the record sheet 31, the exposed portion of the ticket upon which the data is to be applied directly overlies the line correspondingly numbered 001 on the record sheet so that the data applied to ticket 001 is through the copying ribbon simultaneously applied to the line numbered 001. When the data has been properly applied to the ticket, the operator pulls the handle 23 toward him. This movement of the handle feeds the ticket strip across the table the length of one ticket, in the manner previously described, and that ticket may then be torn off from the strip and handed to the purchaser. Preferably, the ticket strip is perforated between consecutive tickets to facilitate separation of the tickets from the strip. Upon release of the handle 23, it is restored to normal position by spring 24, which operation through the instrumentality of the feed dog 39 feeds the table 26 upwardly or rearwardly one space, thereby aligning the next line on the record sheet with the data receiving portion of the next ticket which has been fed forward into that position.

The tickets are thus successively delivered and a record of each kept upon the record sheet until the last line at the bottom of the record sheet has been filled, whereupon the fingers 35 will be engaged with the lower edge of the guard plate 36 so that upon the next actuation of lever 23 the guard plate will be shoved up to cover the normally exposed portion of the ticket and thereby prevent the seller from applying any data to the ticket. This warns him that the topmost sheet of the record pad is full. He thereupon tears off this sheet, files it away, depresses the lever 67 which clears the mechanism from the pad, and releases the feed dog, whereupon the table 26 may be manually pulled downwardly or to the right viewing Fig. 3 until the flange 32 engages the abutment 33, thus aligning the topmost line of the next sheet with the positioned ticket. The guard plate 36 may then be manually restored to normal position, and the operations of applying the data and delivering the tickets may be resumed.

The structural details of a machine embodying the principles of my invention may obviously be varied within considerable limits without departing from the spirit of the invention as defined in the following claims.

I claim:

1. In a machine of the character described, the combination of a frame, a record sheet holding table slidably mounted thereon, a transfer ribbon extending across the table above the record sheet thereon, means for feeding a strip of ticket material across the table in alignment with said transfer ribbon, operating mechanism for actuating said strip feeding means and said table to advance the strip and table by step by step movements, a guard plate in proximity to said strip, and means for moving said guard plate into position over the strip upon movement of the table to a predetermined position.

2. In a machine of the character described, the combination of a housing, a record sheet holding table slidably mounted thereon, means for advancing said table on the housing, a transfer ribbon overlying the record sheet on said table, means for feeding a strip of ticket material across the table in alignment with the transfer ribbon, a frame overlying said table and movable vertically relatively thereto, a guard plate carried by said frame and normally disposed in proximity to said strip, means carried by the table for moving said guard plate into position over said strip when the table is moved to a predetermined position, and means for elevating said frame to free the record sheet and release the table from the advancing means to permit restoration of the table to initial position.

3. In a machine of the character described, the combination of a housing, a table slidably mounted thereon and adapted to hold a record sheet, means for advancing said table longitudinally by a step by step movement, a transfer ribbon overlying the table, means for feeding a strip of ticket material across the table in alignment with the transfer ribbon, a frame movably mounted on the housing, a guard plate carried by the frame and normally overlying a portion of said strip, means for moving said guard plate into position to cover the strip when the table reaches the limit of its upward movement on the housing, means for elevating said frame to clear the record sheet and disengage the table from its feed mechanism to permit manual restoration of the table to initial position, and mechanism for alternately advancing said table and said strip by step by step movements.

4. In a machine of the character described, the combination of a table for supporting a record sheet, means for supporting a strip of tickets or the like, means for alternately advancing the ticket strip across the record sheet and advancing the record sheet transversely of the ticket strip at each actuation thereof, means for holding impression transferring material interposed between said strip and sheet for duplicating upon the record sheet and upon the back of the ticket strip data applied to the face of said ticket strip, a frame overlying the table, a guard plate carried thereby, and means for elevating said frame and releasing the table from the advancing means.

5. In a machine of the character described, the combination of a table for supporting a record sheet, means for supporting a strip of tickets or the like, means for alternately advancing the ticket strip across the record sheet table and advancing the record sheet table transversely of the ticket strip a predetermined distance at each actuation thereof, means for holding impression transferring material interposed between said strip and sheet for transferring data imprinted upon said strip to said sheet, and means for releasing said table for restoration to initial position.

6. In a machine of the character described, the combination of a longitudinally movable table for holding a record sheet, means for holding a strip of impression receiving material, means for guiding said strip transversely of said sheet, means for holding impression transferring material interposed between said strip and said sheet, means for advancing said strip and said table in step by step movements to thereby successively position blank areas of said strip and sheet in alignment for the simultaneous reception of impressions, means for holding said table against retrograde movement, and means for releasing the table for return movement.

7. In a machine of the character described, the combination of a table adapted to hold a record sheet, a transfer ribbon extending transversely of said sheet, means for advancing the table by a step by step movement to successively present blank areas of the sheet beneath said ribbon, means for supporting a roll of ticket material, means for guiding said material across said sheet in alignment with said ribbon, means for advancing said material by a step by step movement, a common operating means for alternately advancing said strip and said table, a frame overlying the table, and means for elevating said frame and releasing the table from the operating means therefor.

MYRON L. HANEY.